United States Patent Office 2,769,006
Patented Oct. 30, 1956

2,769,006

SOLUBILIZING METAL-8-HYDROXY QUINOLATES

Victor N. Kalberg, Skokie, Ill., assignor to Scientific Oil Compounding Company, Inc., a corporation of Illinois No Drawing. Application February 17, 1951,
Serial No. 211,571

24 Claims. (Cl. 260—270)

This invention relates to so-called permanent fungicidal and/or fungistatic compounds or compositions and to methods of making the same.

The present invention is an improvement over the inventions described and claimed in my copending Patents Nos. 2,561,379 and 2,561,380. In these patents there are disclosed methods of making fungicidal compositions by reacting a water-insoluble metal salt of an hydroxyquinoline and a water-insoluble soap, and the products of such reactions.

The present invention consists in reacting a water-insoluble metal quinolinolate with a water-insoluble soap and a phenol. The proportions of the reactants may be varied widely, as desired. They may be stoichiometrical proportions. It is preferred that the total proportion of the water-insoluble soap and the phenol be in substantial molar excess over the amount of the water-insoluble metal quinolinolate. The proportion of phenol with respect to the water-insoluble soap may be varied as desired.

The reaction temperature may be varied widely, as desired, from room temperature or even below up to the lowest decomposition temperature of the reactants, but in order to speed the reaction, it is preferable to use elevated temperatures.

The reaction products of the present invention are capable of being dissolved readily in one or more of the common organic solvents including aliphatic solvents such as methanol and acetone as well as the coal tar solvents and aromatic solvents such as xylol, benzol or toluol, whereas the water-insoluble metal quinolinolate is insoluble in such media. They are also dissolved or dispersed in mineral spirits, and in oils and oily materials such as vegetable oils, fish oils, and mineral oils, molten rosin, and the saturated and unsaturated higher aliphatic acids containing from six to eighteen carbon atoms, or in a mixture of such materials. And the new compounds form stable aqueous emulsions. The resulting solutions or dispersions have usefulness as fungicidal and/or fungistatic sprays, impregnants and coatings in the treatment of canvas, webbing, threads, yarns, rope, cord, wood, paper, leather, resins, and the like.

The compounds of the present invention may be incorporated in varnishes, sealers, lacquers, paints, and the like, and the resulting products are thereby made fungus-resistant. Phenol-aldehyde resins, urea-aldehyde resins, melamine-aldehyde resins, polymerizable polyester resins, alkyds including unsaturated alkyd resins, vinyl resins, polyethylene resins as well as other resins, may have incorporated therewith during compounding the compounds of the present invention and thereby these resins are made fungus-resistant. Low and high melt-point mineral and synthetic waxes and greases are made fungus-resistant by dissolving or dispersing therein the compounds of the present invention.

The water-insoluble metal quinolinolate reactant may be an alkaline earth metal salt, a heavy metal salt, or an aluminum, tin or beryllium salt of an hydroxyquinoline having the phenolic hydroxy group located in any position in the benzene nucleus or the nitrogen ring of the quinoline radical, or in more than one such position. Examples of these salts are the calcium, barium, magnesium, beryllium, lead, mercury, manganese, cobalt, nickel, iron, copper, cadmium, silver, thallium, tin, zinc and aluminum salts of 2-hydroxyquinoline, 4-methyl-2-hydroxyquinoline, 4-hydroxyquinoline, 2-methyl-4-hydroxyquinoline, 5-hydroxyquinoline, 6-hydroxyquinoline, 7-hydroxyquinoline and 8-hydroxyquinoline. The preferred compounds of the present invention are the products formed by reacting a water-insoluble soap and a phenol with a heavy metal salt, particularly a copper salt, of 8-hydroxyquinoline. Examples of these salts are copper-8-quinolinolate, copper 5, 7-dichloro-8-quinolinolate and copper 5, 7-dibromo-8-quinolinolate.

Of the water-insoluble metal quinolinolate reactants which may be used copper-8-quinolinolate is preferred because it is commercially available and because it reacts readily with a water-insoluble soap and a phenol to produce compounds in accordance with the present invention having superior fungicidal and/or fungistatic properties.

The metal soaps which are used as reactants in accordance with the present invention are water-insoluble soaps of a metal or a mixture of metals and a soap-forming acid or a mixture of such acids. Thus, the soaps may be soaps of nickel, calcium, barium, magnesium, mercury, lead, cadmium, silver, thallium, manganese, cobalt, iron, copper, tin, aluminum and the like. The preferred soaps are the copper, nickel, and zinc soaps.

The soap-forming acids used in forming the aforesaid metal soaps include caproic acid, caprylic acid, capric acid, ethylhexoic acid, lauric acid, myristic acid, palmitic acid, stearic acid, oleic acid, linoleic acid, linolenic acid, palmitoleic acid, melissic acid, hydroxystearic acid, ricinoleic acid, and like carboxylic acids, and mixtures thereof. The preferred soap-forming fatty acids or materials are those saturated and unsaturated higher aliphatic carboxylic acids containing from six to eighteen carbon atoms, and rosin. Other soap-forming fatty acids which may be used in forming the metal soaps used in accordance with the present invention are the mixed higher fatty acids derived from animal or vegetable sources such as, for example, sardine and other fish oils, lard, coconut oil, sesame oil, soybean oil, tung oil, corn oil or partially or completely hydrogenated derivatives of such oils, fatty acids derived from carnauba, spermaceti, beeswax, candelilla wax and like waxes, and carboxylic acids derived from petroleum or other hydrocarbons. Other soap-forming acids which may be used are naphthenic acid, tall oil fatty acids, and hydroaromatic acids such as abietic acid and the like.

The above described soaps and soap-forming acids not only enter into the reaction with the water-insoluble metal quinolinolate and the phenol, but also assist in serving as a reaction medium in which the reaction can be conveniently carried out. A substantial molar excess of the metal soap (or soap-forming acid if the soap is prepared in situ) is thus not wasteful of the material.

Any phenol may be used as a reactant in accordance with the present invention but I prefer to use a phenol of the general formula:

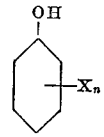

wherein X represents the following radicals: H, OH, CHO, $NO_2$, Cl, Br, alkyl, aryl, alkaryl, aralkyl, $CONH_2$, COOR and OR'; wherein $n$ represents an integer, 1 to 5; and wherein the R of the radical COOR represents H, alkyl and aryl, and the R' of the radical OR' represents alkyl and aryl. The X substituents may be alike or dissimilar, as desired. Examples of phenol compounds falling within the ambit of this general formula are phenol, octyl phenol, nonyl phenol, ortho amyl phenol, para cresol, ortho cresol, meta cresol, para chloro meta cresol, tertiary butyl meta cresol, para nitro phenol, salicylaldehyde, salicylamide, ortho cyclohexyl phenol, resorcinol, pyrogallol, 2,4-dichlorophenol, pentachlorophenol, picric acid, thymol (5-methyl-2-isopropyl phenol), 2,3,4,6-tetrachlorophenol, tetrachloro hydroquinone, 6-tertiarybutyl-3-methyphenol, xylenol, chloroxylenol 4-phenyl phenol, 2,4,6-tribromophenol, para tolyl phenol, xylyl phenol, phenyl salicylate, para hydroxy propiophenone, methyl salicylate, 2,2'-dihydroxy-5,5'-dichlorodiphenylmethane (G-4), and any mixture thereof. The G-4 compound is also known as bis (5-chloro 2-hydroxyphenyl) methane.

The following are illustrative examples of methods of preparing the reaction products of the present invention. The reaction, in each instance, was carried out in a glass (Pyrex) reaction vessel with constant stirring of the reactants; however, it may be carried out in a reaction vessel made of stainless steel or other non-corrodible material. In these examples the term "part" refers to parts by weight.

*Example 1*

Nickel 2-ethyl hexoate was prepared in situ by mixing 100 parts of 2-ethyl hexoic acid with 60 parts of nickel acetate and this mixture was stirred and heated to 420° F. until all of the acetic acid was vaporized. 100 parts of nonyl phenol were then stirred into the solution. The addition of the phenol cooled the solution to 250° F. 58 parts of copper-8-quinolinolate were added with stirring and the mixture was heated to 340° F. A clear solution was obtained. One part of the resulting reaction product was diluted in one part of xylol. One part of this xylol solution was diluted with 19 parts of mineral spirits.

The resulting solution was used to treat duck samples which were tested.

Samples of 10 oz. specification army duck were cut into 10" x 30" pieces and the pieces were thoroughly washed, rinsed and dried. One piece was saturated with the dilute solution at room temperature and then passed through a wringer to remove the excess of impregnating solution. Approximately 50% wet weight increase was obtained so that the fabric contained about 1.25% of the reaction product. The impregnated fabric was then air-dried at room temperature for 24 hours to obtain substantially complete solvent release.

The treated fabric was leached for 24 hours in running water and then buried horizontally in a well composted soil bed, one-half inch below the soil surface. A control piece of the same duck, only untreated with impregnating solution, was similarly buried in the same bed. Both pieces of fabric were kept in the soil bed for a period of 28 days, during which time the soil temperature was maintained at about 70° F. and the moisture content was kept between 30–50%.

After the 28-day burial period, both pieces of duck were removed. The treated piece was washed to remove soil particles and air-dried at room temperature. This piece had maintained its original appearance, showed no appreciable decrease in tensile strength and in all other respects showed no ill effects as a result of its burial in the soil. On the other hand, the untreated piece was completely destroyed, having deteriorated into many small, stained fragments.

*Example 2*

100 parts of 2-ethyl hexoic acid were mixed with 60 parts of nickel acetate and stirred and heated to 420° F. until all of the acetic acid was vaporized. 100 parts of thymol (5-methyl-2 isopropyl phenol) were stirred into the mixture. The addition of the thymol lowered the temperature to approximately 250° F. 58 parts of copper-8-quinolinolate were added and the temperature of the mixture was raised to 340° F. with stirring. A clear solution was obtained. One part of this solution was diluted in one part of benzol. One part of this benzol solution was diluted with 19 parts of mineral spirits.

A duck sample, similar to that in Example 1, was impregnated with the dilute solution and then further treated and buried in soil, together with a control piece, all as described in Example 1.

The treated specimen showed no appreciable evidence of microorganism attack while the control piece was completely destroyed.

*Example 3*

100 parts of 2-ethyl hexoic acid were mixed with 60 parts of nickel acetate and the mixture was stirred and heated to 420° F. until all of the acetic acid was vaporized. 100 parts of mono tertiary butyl meta cresol were stirred into the mixture which lowered the temperature to 250° F. 58 parts of copper-8-quinolinolate were stirred into the mixture and the temperature was raised to 340° F. A clear solution resulted. One part of the resulting solution was diluted with one part of toluol. One part of this toluol solution was diluted with 19 parts of mineral spirits.

A duck sample, similar to that in Example 1, was impregnated with the dilute solution and then further treated and buried in soil, together with a control piece, all as described in Example 1.

The treated specimen showed no appreciable evidence of microorganism attack while the control piece was completely destroyed.

The present invention is not to be construed as limited to the above examples. For instance, while in the above examples the water-insoluble soap was prepared in situ, the soap may be pre-prepared. Examples of such soaps which have been used in lieu of nickel 2-ethyl hexoate are zinc oleate, aluminum oleate, copper oleate, magnesium oleate, nickel caproate and zinc stearate. In lieu of the phenols of the above examples, salicylamide, ortho amyl phenol, para nitro phenol, 2,4-dichlorophenol, resorcinol, 2-4-6 tribromophenol and pyrogallol were successfully used. Also, although copper-8-quinolinolate is preferred, other quinolinolates such as aluminum-8-quinolinolate, nickel-8-quinolinolate, nickel-5-quinolinolate, lead-7-quinolinolate, lead-8-quinolinolate and zinc-8-quinolinolate have been found to be highly effective.

The reaction products of each of Examples 1 to 3, inclusive, in the form of the solutions described, were individually applied to wood samples 1" x 3" and to leather squares 2" x 2" by soaking under vacuum for 20 minutes and drying for 6 hours. The treated specimens and untreated control specimens of similar dimensions were placed on a sterile nutrient agar medium with a pH of 5.5, which was used for the substratum in the petri dishes in which the specimens were placed. Each treated specimen and a control specimen were placed in a single petri dish. The specimens in each of these dishes were sprayed with a spore suspension of the following organisms and incubated at 30° C. for 14 days:

*Chaetomium globosum*
*Penicillium citrinum*
*Aspergillus niger*
*Aspergillus terreus*
*Trichoderma viride*
*Aspergillus flavus*

At the conclusion of this test period it was found that fungi were growing over the entire surface of the leather and wood control specimens and that no growth existed on the treated wood and leather specimens.

The reaction products of the present invention can be used to treat textiles, paper, leather and the like by impregnating or coating these materials with a solution or dispersion of the reaction product in a suitable vehicle. Thus, the solutions described above may be used to treat these materials. These solutions may be compounded with resins, animal, vegetable and fish oils, plasticizers, driers, anti-oxidants and the like, in accordance with known techniques, to impart to the solutions desired properties. For example, characteristics such as spread and flow of these solutions may be modified by the addition thereto of a fatty acid such as lauric acid, oleic acid, linseed oil fatty acids, hempseed oil fatty acids, and like fatty acids having from 8 to 20 carbon atoms in the chain, and of a fatty acid glyceride, either raw or treated, such as raw or bodied linseed oil, China wood oil, caster oil, dehydrated castor oil, and the like. Compatible natural and synthetic resins such as rosin, phenol-aldehyde resins, urea-aldehyde resins, vinyl resins and the like, or compatible cellulose derivatives such as nitrocellulose, cellulose acetate, ethyl cellulose and the like may be incorporated in the solutions in varying proportions to meet any desired needs.

Plasticizers such as glycerine, dibutyl phthalate, dioctyl phthalate, pentaerythritol, sorbitol, mannitol and other compatible plasticizers may be added to the solutions. Suitable anti-oxidants which may be added to the solution are phenyl salicylate, tertiary butyl catechol and guaiacol, and suitable driers are zinc naphthenate, lead naphthenate, cobalt naphthenate and zinc octoate.

If it is desired to impart water-proof properties to the solutions of the reaction products of the present invention, various waxes such as paraffin wax, beeswax, carnauba wax, spermaceti wax, synthetic waxes, and the like, may be incorporated in the solutions in varying proportions to meet the desired needs.

By a proper choice of the solvents for the reaction products of the present invention and of suitable modifying agents, the resulting liquid compositions may be controlled as to consistency, drying time, flow, penetration, and the like.

The reaction products of the present invention need not be used in solution or dispersion form but may be incorporated directly in resins, greases, waxes and similar compositions by compounding these reaction products with other constituents of the compositions in accordance with known techniques. Better distribution of the reaction products in these compositions are obtained if the reaction products are dissolved or dispersed in a suitable vehicle.

Compositions containing reaction products of the present invention not only inhibit the growth of fungus organisms but may also kill the activity of all existing fungus growth on contact. Textiles, leather, wood, resins, etc., which have been treated with the reaction products of the present invention are not attacked to any appreciable extent by soil animal life and these treated materials resist the action of bacteria and insects. The reaction products of the present invention lend themselves for use as insecticides, in either dry or liquid form, and for preventing and combating diseases of plant life, both those diseases which attack the parts of plants above ground and diseases such as rot which attack underground parts of the plant.

While the present invention has been described in connection with certain specific examples of methods of making the reaction products, it is obvious that my invention is not to be construed as limited to the specific materials disclosed in these examples or to the details of the methods set forth therein, since changes in materials, proportions and method details may be made without departing from the scope of my invention as defined in the appended claims.

I claim:

1. A product formed by maintaining a mixture of a water-insoluble metal quinolinolate, a water-insoluble metal carboxylic acid soap and an alkyl phenol in which the alkyl group has at least 8 and not more than 15 carbon atoms at a temperature below the lowest decomposition temperature of the reactants until solution is obtained.

2. A product formed by maintaining a mixture of a water-insoluble metal quinolinolate, a water-insoluble metal carboxylic acid soap and nonyl phenol at a temperature below the lowest decomposition temperature of the reactants until solution is obtained.

3. The method of making a material having fungicidal properties comprising maintaining a mixture of a water-insoluble metal quinolinolate, a water-insoluble metal carboxylic acid soap and a phenol at a temperature below the lowest decomposition temperature of the reactants until solution is obtained, said phenol having the general formula

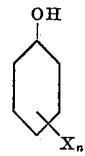

wherein X is a radical of the group consisting of H, OH, CHO, $NO_2$, Cl, Br, alkyl, aryl, alkaryl, aralkyl, $CONH_2$, COOR and OR'; wherein $n$ represents an integer, 1 to 5; and wherein the R of the radical COOR represents H, alkyl and aryl, and the R' of the radical OR' represents alkyl and aryl; and wherein when $n$ is an integer greater than 1 the radical X may be alike or dissimilar.

4. The product formed by the method of claim 3.

5. The method of making a material having fungicidal properties comprising maintaining a mixture of a water-insoluble heavy metal quinolinolate, a water-insoluble metal carboxylic acid soap and a phenol at a temperature below the lowest decomposition temperature of the reactants until solution is obtained, said phenol having the general formula

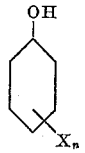

wherein X is a radical of the group consisting of H, OH, CHO, $NO_2$, Cl, Br, alkyl, aryl, alkaryl, aralkyl, $CONH_2$, COOR and OR'; wherein $n$ represents an integer, 1 to 5; and wherein the R of the radical COOR represents H, alkyl and aryl, and the R' of the radical OR' represents alkyl and aryl; and wherein when $n$ is an integer greater than 1 the radical X may be alike or dissimilar.

6. The product formed by the method of claim 5.

7. The method of making a material having fungicidal properties comprising maintaining a mixture of a water-insoluble metal-8-quinolinolate, a water-insoluble metal carboxylic acid soap and a phenol at a temperature below the lowest decomposition temperature of the reactants until solution is obtained, said phenol having the general formula

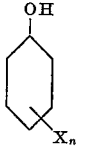

wherein X is a radical of the group consisting of H, OH, CHO, $NO_2$, Cl, Br, alkyl, aryl, alkaryl, aralkyl, $CONH_2$, COOR and OR'; wherein $n$ represents an integer, 1 to 5; and wherein the R of the radical COOR represents H, alkyl and aryl, and the R' of the radical OR' represents alkyl and aryl; and wherein when $n$ is an integer greater than 1 the radical X may be alike or dissimilar.

8. The product formed by the method of claim 7.

9. The method of making a material having fungicidal properties comprising maintaining a mixture of a water-insoluble heavy metal-8-quinolinolate, a water-insoluble metal carboxylic acid soap and a phenol at a temperature below the lowest decomposition temperature of the reactants until solution is obtained, said phenol having the general formula

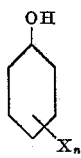

wherein X is a radical of the group consisting of H, OH, CHO, NO₂, Cl, Br, alkyl, aryl, alkaryl, aralkyl, CONH₂, COOR and OR'; wherein $n$ represents an integer, 1 to 5; and wherein the R of the radical COOR represents H, alkyl and aryl, and the R' of the radical OR' represents alkyl and aryl; and wherein when $n$ is an integer greater than 1 the radical X may be alike or dissimilar.

10. The product formed by the method of claim 9.

11. The method of making a material having fungicidal properties comprising maintaining a mixture of a copper-8-quinolinolate, a water-insoluble metal carboxylic acid soap and a phenol at a temperature below the lowest decomposition temperature of the reactants until solution is obtained, said phenol having the general formula

wherein X is a radical of the group consisting of H, OH, CHO, NO₂, Cl, Br, alkyl, aryl, alkaryl, aralkyl, CONH₂, COOR and OR'; wherein $n$ represents an integer, 1 to 5; and wherein the R of the radical COOR represents H, alkyl and aryl, and the R' of the radical OR' represents alkyl and aryl; and wherein when $n$ is an integer greater than 1 the radical X may be alike or dissimilar.

12. The product formed by the method of claim 11.

13. The method of making a material having fungicidal properties comprising maintaining a mixture of a water-insoluble metal quinolinolate, a nickel soap and a phenol at a temperature below the lowest decomposition temperature of the reactants until solution is obtained, said phenol having the general formula

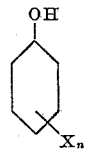

wherein X is a radical of the group consisting of H, OH, CHO, NO₂, Cl, Br, alkyl, aryl, alkaryl, aralkyl, CONH₂, COOR and OR'; wherein $n$ represents an integer, 1 to 5; and wherein the R of the radical COOR represents H, alkyl and aryl, and the R' of the radical OR' represents alkyl and aryl; and wherein when $n$ is an integer greater than 1 the radical X may be alike or dissimilar.

14. The product formed by the method of claim 13.

15. The method of making a material having fungicidal properties comprising maintaining a mixture of copper-8-quinolinolate, a nickel carboxylic acid soap and a phenol at a temperature below the lowest decomposition temperature of the reactants until solution is obtained, said phenol having the general formula

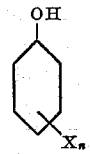

wherein X is a radical of the group consisting of H, OH, CHO, NO₂, Cl, Br, alkyl, aryl, alkaryl, aralkyl, CONH₂, COOR and OR'; wherein $n$ represents an integer, 1 to 5; and wherein the R of the radical COOR represents H, alkyl and aryl, and the R' of the radical OR' represents alkyl and aryl; and wherein when $n$ is an integer greater than 1 the radical X may be alike or dissimilar.

16. The product formed by the method of claim 15.

17. The method of making a material having fungicidal properties comprising maintaining a mixture of copper-8-quinolinolate, nickel 2-ethyl hexoate and nonyl phenol at a temperature below the lowest decomposition temperature of the reactants until solution is obtained.

18. The product formed by the method of claim 17.

19. The method of making a material having fungicidal properties comprising maintaining a mixture of copper-8-quinolinolate, nickel 2-ethyl hexoate and thymol at a temperature below the lowest decomposition temperature of the reactants until solution is obtained.

20. The product formed by the method of claim 19.

21. The method of making a material having fungicidal properties comprising maintaining a mixture of copper-8-quinolinolate, nickel 2-ethyl hexoate and monotertiary butyl cresol at a temperature below the lowest decomposition temperature of the reactants until solution is obtained.

22. The product formed by the method of claim 21.

23. The method of making a material having fungicidal properties comprising maintaining a mixture of aluminum-8-quinolinolate, a water-insoluble metal carboxylic acid soap and a phenol at a temperature below the lowest decomposition temperature of the reactants until solution is obtained, said phenol having the general formula

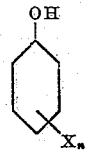

wherein X is a radical of the group consisting of H, OH, CHO, NO₂, Cl, Br, alkyl, aryl, alkaryl, aralkyl, CONH₂, COOR and OR'; wherein $n$ represents an integer, 1 to 5; and wherein the R of the radical COOR represents H, alkyl and aryl, and the R' of the radical OR' represents alkyl and aryl; and wherein when $n$ is an integer greater than 1 the radical X may be alike or dissimilar.

24. The product formed by the method of claim 23.

No references cited.